(12) United States Patent
Chen et al.

(10) Patent No.: US 11,334,121 B2
(45) Date of Patent: May 17, 2022

(54) HINGE CONNECTORS WITH ROTATION CONTROL UNITS

(71) Applicant: Hewlett-Packard Development Company, L.P., Spring, TX (US)

(72) Inventors: Wei-Chung Chen, Taipei (TW); Kuan-Ting Wu, Taipei (TW); Chung Hua Ku, Taipei (TW)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/481,466

(22) PCT Filed: Dec. 15, 2017

(86) PCT No.: PCT/US2017/066617
§ 371 (c)(1),
(2) Date: Jul. 27, 2019

(87) PCT Pub. No.: WO2019/117939
PCT Pub. Date: Jun. 20, 2019

(65) Prior Publication Data
US 2021/0294388 A1 Sep. 23, 2021

(51) Int. Cl.
*G06F 1/16* (2006.01)
(52) U.S. Cl.
CPC .......... *G06F 1/1679* (2013.01); *G06F 1/1681* (2013.01)
(58) Field of Classification Search
CPC .... G06F 1/1679; G06F 1/1681; G06F 1/1616; E05D 11/1028; E05Y 2201/21; E05Y 2900/606
See application file for complete search history.

(56) References Cited

U.S. PATENT DOCUMENTS

| | | | |
|---|---|---|---|
| 6,775,128 B2 | 8/2004 | Leitao | |
| 7,520,028 B2 * | 4/2009 | Borleis | E05D 3/122 16/354 |
| 8,104,144 B2 * | 1/2012 | Wang | G06F 1/1681 16/354 |
| 8,467,183 B2 * | 6/2013 | Probst | G06F 1/1654 361/679.55 |
| 8,472,186 B2 * | 6/2013 | Probst | G06F 1/1616 361/679.55 |
| 9,405,322 B2 | 8/2016 | Ashcraft et al. | |
| 9,459,662 B2 | 12/2016 | Senatori | |
| 9,856,688 B2 * | 1/2018 | Elie | F16H 19/06 |
| 9,964,989 B2 * | 5/2018 | Krivoy | G06F 1/1681 |

(Continued)

FOREIGN PATENT DOCUMENTS

| | | |
|---|---|---|
| CN | 200953103 Y | 9/2007 |
| CN | 104571345 A | 4/2015 |

(Continued)

*Primary Examiner* — Anthony M Haughton
*Assistant Examiner* — Theron S Milliser
(74) *Attorney, Agent, or Firm* — Lakshmi Kumaran & Sridharan

(57) ABSTRACT

The present subject matter relates to hinge connectors with rotation control units. In an example, a hinge connector may couple a base unit with a cover unit of a device. The hinge connector includes hinge shaft. The rotation control unit is to control the rotation of the hinge shaft and stop a free-rotation of the hinge shaft at a predefined angle with respect to the base unit.

15 Claims, 3 Drawing Sheets

(56) References Cited

U.S. PATENT DOCUMENTS

| | | | |
|---|---|---|---|
| 10,407,957 B1* | 9/2019 | Camp | F16D 13/752 |
| 10,732,677 B2* | 8/2020 | Gopalan | H04M 1/02 |
| 10,928,864 B1* | 2/2021 | Sanchez | E05D 11/1028 |
| 11,016,539 B2* | 5/2021 | Hallar | G06F 1/1681 |
| 2004/0013403 A1 | 1/2004 | Asada et al. | |
| 2006/0002066 A1 | 1/2006 | Doczy et al. | |
| 2007/0096503 A1* | 5/2007 | Borleis | E05D 3/127 |
| | | | 296/146.11 |
| 2011/0157780 A1* | 6/2011 | Wang | G06F 1/1681 |
| | | | 361/679.01 |
| 2011/0267757 A1* | 11/2011 | Probst | G06F 1/1632 |
| | | | 361/679.09 |
| 2012/0106059 A1* | 5/2012 | Probst | G06F 1/1681 |
| | | | 361/679.09 |
| 2017/0145724 A1* | 5/2017 | Siddiqui | E05F 1/1284 |
| 2017/0356225 A1 | 12/2017 | Maatta | |
| 2021/0096609 A1* | 4/2021 | Hallar | G06F 1/1618 |

FOREIGN PATENT DOCUMENTS

| | | |
|---|---|---|
| CN | 106030130 A | 10/2016 |
| JP | 2007046748 A | 2/2007 |

\* cited by examiner

HINGE CONNECTORS WITH ROTATION CONTROL UNITS

BACKGROUND

Devices, such as laptops, may include a base unit and a cover unit coupled to the base unit by a hinge connector. The base unit, for example, may house a processor(s), a memory device(s), and input/output (I/O) devices and interfaces of the device. The cover unit, for example, may house a display unit of the device. The hinge connector may include a hinge shaft and a hinge bracket disposed on the hinge shaft. The hinge shaft may be coupled to the base unit. The cover unit may be coupled to the hinge bracket. The rotation of the hinge shaft may rotate the hinge bracket, which may allow the cover unit to pivot about the base unit.

BRIEF DESCRIPTION OF DRAWINGS

The following detailed description reference the drawings, wherein.

DETAILED DESCRIPTION

Figure 1:
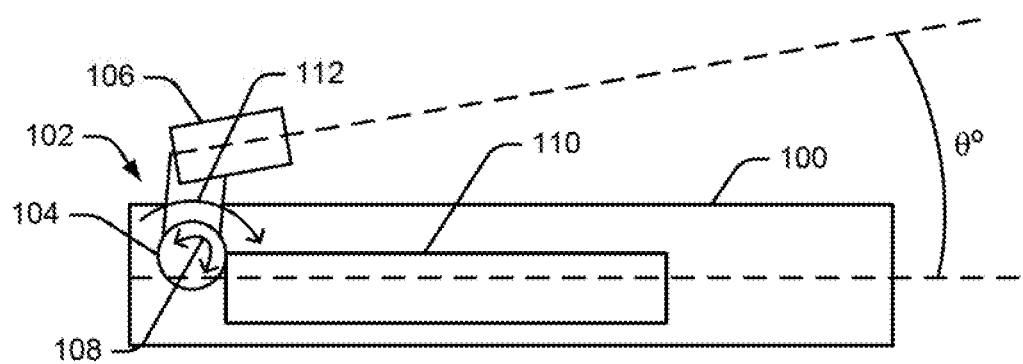
FIG. 1 illustrates a side view a base unit fora device, according to an example.

In a device having a base unit and a cover unit coupled to each other by a hinge connector, the cover unit may pivot about the base unit for closing or opening the cover unit with respect to the base unit. For closing the cover unit, the cover unit may be lowered towards the base unit. For opening, the cover unit, the cover unit may be raised away from the base unit. In a closing or closed position, the cover unit may form an angle of about 0° with respect to the base unit. In an open position, the cover unit may form an angle of more than 0° with respect to the base unit.

When the cover unit is moved to the closing or closed position, the cover unit may come in contact with a surface of the base unit. When near the closing position, the cover unit may close over the base unit under gravitation force acting on the cover unit. An impact of the contact of the cover unit with the surface of the base unit during such a closure may cause scuffing or wearing of the surface of the cover unit or of the base unit or of both. Generally, a rubber bumper or padding may be provided on the cover unit or on the base unit or on both to avoid the scuffing. The rubber bumper may lead to increase in the effective thickness and hence the Z-height of the device. The rubber bumper may also affect the aesthetics of the device.

Generally, the cover unit may house a display unit. The impact of the contact, when the cover unit is closed, may cause wear-off marks and white spotting on the display unit. Protective coatings may be provided on the display unit to avoid such issues. The protective coatings may lead to increase in the thickness of the cover unit, thereby increasing the thickness of the device. The protective coatings may also lead to increase in the cost of the device.

The present subject matter describes rotation control units to control rotation of a hinge connector to avoid scuffing of a cover unit and a base unit of a device, when the cover unit is moved to a closing or closed position. In accordance with an example, the base unit of the device may have a hinge connector. The hinge connector may include a hinge shaft and a hinge bracket coupled to the hinge shaft. The hinge shaft may be coupled to the base unit. The hinge bracket is couplable to the cover unit of the device to allow the cover unit to pivot about the base unit. Further, a rotation control unit may be provided in the base unit. The rotation control unit may be engaged with the hinge shaft of the hinge connector to control the rotation of the hinge shaft. The rotation control unit may be engaged with the hinge shaft so as to stop a free-rotation of the hinge shaft while the cover unit is closing over the base unit and when the cover unit is at a predefined angle from the base unit. Free-rotation of the hinge shaft may refer to a rotation of the hinge shaft under the influence of gravitational force acting on the cover unit, when the cover unit is near the closing position. In an example, the predefined angle may be 3° to 15°.

In an example implementation, the rotation control, unit may include a mechanical arrangement which may interact with the hinge shaft of the hinge connector to control the rotation of the hinge shaft and halt the free-rotation of the hinge shaft, and thus the cover unit, at the predefined angle between the cover unit and the base unit. The halt in the free-rotation at the predefined angle may prevent scuffing of the cover unit and the base unit, and also prevent damage to the display unit housed in the cover unit. The mechanical arrangement may be cost effective and simple and easy to operate for controlling the rotation of the hinge shaft. Further, the present subject matter eliminates the use of rubber bumpers and protective coatings on the display unit, which facilitates in keeping the thickness of the cover unit and the device to a minimum.

The following detailed description refers to the accompanying drawings. Wherever possible, the same reference numbers are used in the drawings and the following description to refer to the same or similar parts. While several examples are described in the description, modifications, adaptations, and other implementations are possible. Accordingly, the following detailed description does not limit the disclosed examples. Instead, the proper scope of the disclosed examples may be defined by the appended claims.

FIG. 1 illustrates a side view of a base unit 100 for a device, according to an example. The base unit 100 may house a processor(s), a memory device(s), an input/output (I/O) devices, interfaces, and other electronic and electrical components of the device. The base unit 100 includes a hinge connector 102 through which a cover unit (not shown in FIG. 1) can be coupled to the base unit 100. The hinge connector 102 includes a hinge shaft 104 and a hinge bracket 106. The hinge shaft 104 is rotatable in a direction 108. The hinge bracket 106 is fixedly connected to the hinge shaft 104, such that the hinge bracket 106 rotates along with the hinge shaft 104.

The base unit 100 also includes a rotation control unit 110. The rotation control unit 110 is coupled to the hinge shaft 104. The rotation control unit 110 is coupled to the hinge shaft 104 so as to control the rotation of the hinge shaft 104, and to stop a free-rotation of the hinge shaft 104 in one direction 112, at a predefined angle θ° between the hinge bracket 106 and the base unit 100. The free-rotation of the hinge shaft 104 in the direction 112 may refer to the rotation while the cover unit, coupled to the hinge bracket 106, is moving towards a closing position under the influence of gravitational force. It may be noted that the angle subtended or formed by the hinge bracket 106 with respect to the base unit 100 may be the same as the angle subtended by the cover unit, coupled to the hinge bracket 106, with respect to the base unit 100. Thus, the predefined angle θ° between the hinge bracket 106 and the base unit 100 may refer to the angle between the cover unit coupled to the hinge bracket 106, and the base unit 100. The predefined angle θ° may be small, such that the cover unit can experience movement towards the closing position under the influence of gravitational force acting on the cover unit. In an example, the predefined angle θ° may be in a range of 3° to 15°. The mechanical arrangement of the rotation control unit 110 is described with reference to FIG. 4.

Figure 2:
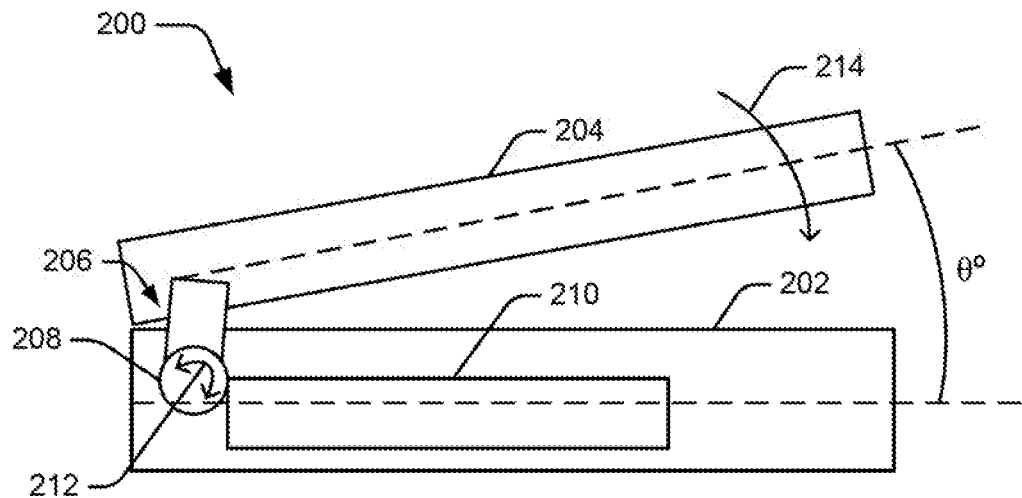
FIG. 2 illustrates a side view of device with a rotation control unit, according to an example.

FIG. 2 illustrates a side view of a device 200 with a rotation control unit 210, according to an example. The device 200 includes a base unit 202 and a cover unit 204 coupled to the base unit 202 by a hinge connector 206. The base unit 202 may be the same as the base unit 100, and the hinge connector 206 may be the same as the hinge connector 102. The cover unit 204 may house a display unit and other electrical and electronic components of the device. The hinge connector 206, as shown, includes a hinge shaft 208, which is rotatable in a direction 212 to allow pivoting of the cover unit 204 about the base unit 202. The hinge connector 206 may also include a hinge bracket (not shown in FIG. 2), similar to the hinge bracket 106 as described and illustrated with respect to FIG. 1.

The rotation control unit 210 may be the same as the rotation control unit 110 as shown and described with respect to FIG. 1. The rotation control unit 210 is coupled to the hinge shaft 208 to control the rotation of the hinge shaft 208, and to stop a free-rotation of the hinge shaft 208 at a predefined angle θ° between the cover unit 204 and the base unit 202 during movement of the cover unit 204, in a direction 214, towards a closing position with respect to the base unit 202. In an example, the predefined angle θ° may be in a range of 3° to 15°. The mechanical arrangement of the rotation control unit 210 is described with reference to FIG. 4.

Figure 3:
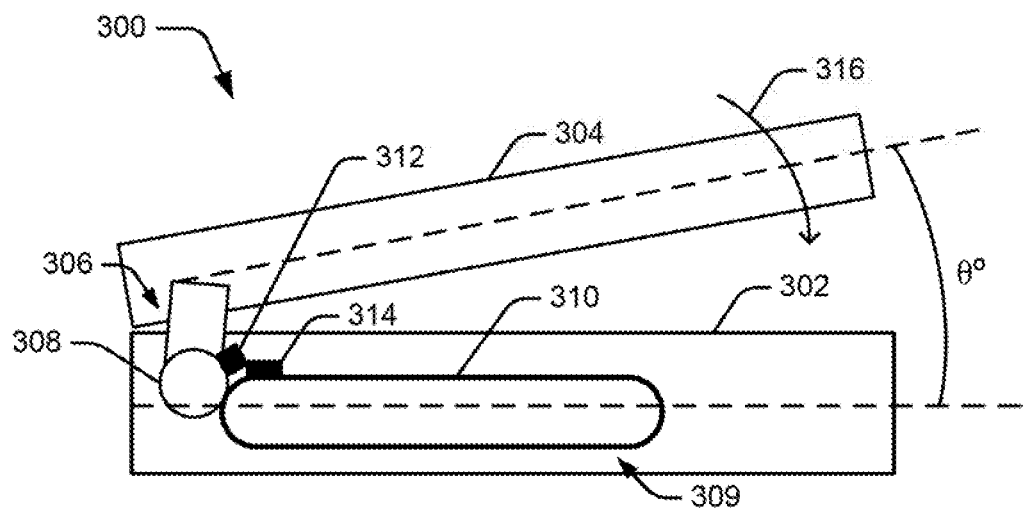
FIG. 3 illustrates a side view of a device, according to an example.

FIG. 3 illustrates a side view of a device 300, according to an example. The device 300 includes a base unit 302 and a cover unit 304 coupled to the base unit 302 by a hinge connector 306. The base unit 302, the cover unit 304, and the hinge connector 306 may be the same as those shown and described with respect to FIG. 2. The hinge connector 306 includes a hinge shaft 308 which can rotate to allow pivoting of the cover unit 304 about the base unit 302. The hinge connector 306 may also include a hinge bracket (not shown in FIG. 3), similar to the hinge bracket 106 as described and illustrated with respect to FIG. 1.

The device 300 includes a rotation control unit 309 disposed in the base unit 302, The rotation control unit 309 include a traction belt 310. The traction belt 310, as shown, is engaged with the hinge shaft 308. The traction belt 310 offers traction that controls the rotation of the hinge shaft 308. The traction offered by the traction belt 310 may be such that a rotation of the hinge shaft 308 results in a movement or rotation of the traction belt 310. It may be noted that the traction belt 310 moves along with the hinge shaft 308 without any slippage between the traction belt 310 and the hinge shaft 308.

In an example, the traction belt 310 may be a roller-based traction belt which runs over a plurality of rollers (not shown in FIG. 3). The plurality of rollers may facilitate a smooth movement or rotation of the traction belt 310, which may be caused by the rotation of the hinge shaft 308. In an example, the traction belt 310 may be made of aramid synthetic fiber that can provide traction for controlling the rotation of the hinge shaft 308.

Further, as shown in FIG. 3, the hinge shaft 308 includes a first protrusion 312 on a surface thereof, and the traction belt 310 includes a second protrusion 314 on a surface thereof. The first protrusion 312 may be molded onto the hinge shaft 308, such that the first protrusion 312 moves along with the hinge shaft 308. Similarly, the second protrusion 314 may be molded onto the traction belt 310, such that the second protrusion 314 moves along with the traction belt 310. The first protrusion 312 is to contact the second protrusion 314 when the cover unit 304 is at a predefined angle θ° with respect to the base unit 302 during movement of the cover unit 304 in a direction 316, towards a closing position. The contact of the first protrusion 312 and the second protrusion 314 with each other at the predefined angle θ° stops or halts the free-rotation of the hinge shaft 308. In an example, the predefined angle θ° may be in a range of 3° to 15°.

In an example, each of the first protrusion 312 and the second protrusion 314 may be a 3-dimensional structure of a shape and size such that the first protrusion 312 and the second protrusion 314, when come in contact with each other, be able to stop the free-rotation of the hinge shaft 308. The first protrusion 312 and the second protrusion 314 may, for example, have a shape of a cube, a cuboid, a cylinder, a pyramid, or the like. Further, the first protrusion 312 and the second protrusion 314 may have a width and a height in a range of about 3 mm to 10 mm.

Figure 4A:
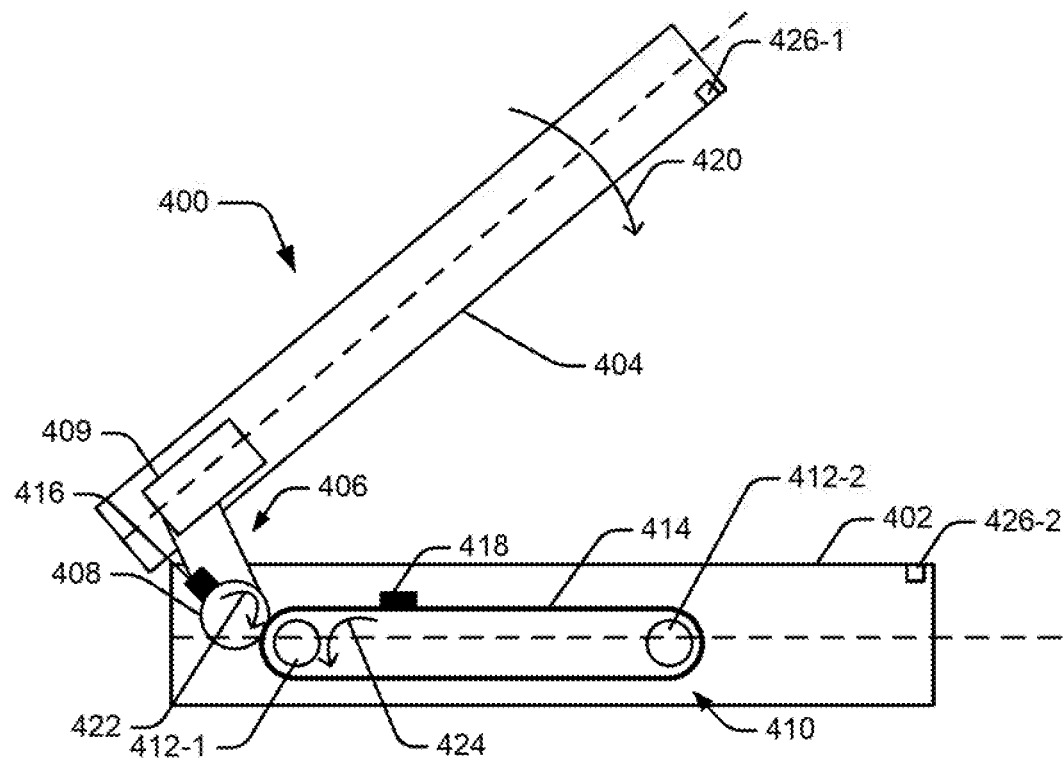
FIGS. 4(a)-4(b) illustrate side views of a device with different positions of a cover unit of the device, according to an example.
Figure 4B:
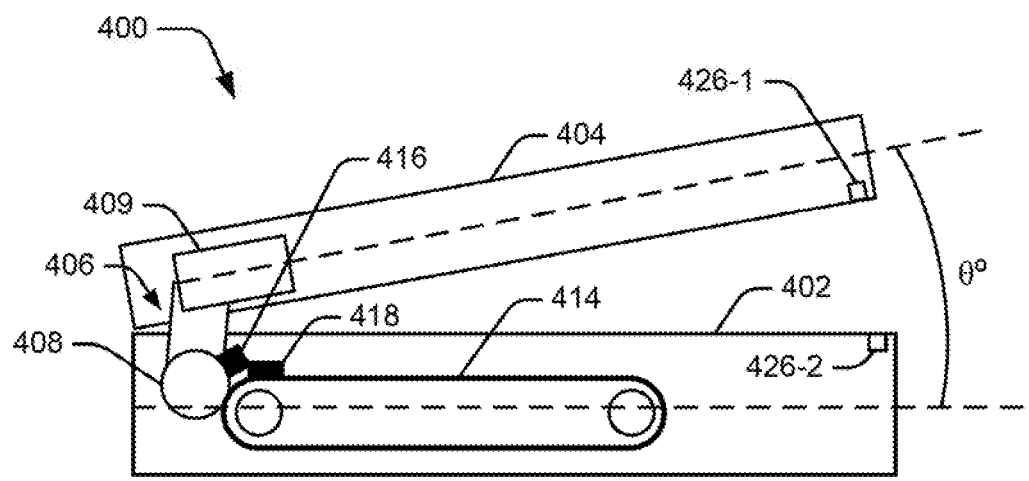

FIGS. 4(a)-4(b) illustrate side views of a device 400 with different positions of a cover unit of the device 400, according to an example. The device 400 includes a base unit 402, a cover unit 404, and a hinge connector 406, similar to as shown and described with respect to FIGS. 1, 2, and 3. The device 400 includes a rotation control unit 410. The rotation control unit 410, as shown, includes a plurality of rollers 412-1 and 412-2, and a traction belt 414. The plurality of rollers may be referred to as the rollers 412, The traction belt 414 is movable over the rollers 412. The traction belt 414 is in contact with a hinge shaft 408 of the hinge connector 406 to control the speed of rotation of the hinge shaft 408.

Further, as shown in FIGS. 4(a) and 4(b), the hinge shaft 408 includes a first protrusion 416, and the traction belt 414 includes a second protrusion 418. The first protrusion 416 is on the surface of the hinge shaft 408 and moves along with the hinge shaft 408. The second protrusion 418 is on the surface of the traction belt 414 and moves along with the traction belt 414. FIG. 4(a) shows the device 400 in which the cover unit 404 is in an open position with respect to the base unit 402. The movement of the cover unit 404 in a direction 420 towards the closing position moves the hinge shaft 408 in a direction 422 and the hinge shaft 408, in turn, moves the traction belt 414 in a direction 424. In an example, the movement of the cover unit 404 in the direction 420 may be initiated manually by a user of the device 400. At a position of the cover unit 404 where a hinge bracket 409 or the cover unit 404 is at the predefined angle θ° from the base unit 402, as shown in FIG. 4(b), the second protrusion 418 comes in contact with the first protrusion 416, thereby stopping or halting the free-rotation of the hinge shaft 408. The stopping of the cover unit 404 at the predefined angle θ° with respect to the base unit 402 prevents collision of the cover unit 404 with the base unit 402 during the movement of the cover unit 404 towards the closing position.

In an example implementation, at least one of the first protrusion 416 and the second protrusion 418 is flexible. The flexible protrusion may be made of thermoplastic polyurethanes (TPU), thermoplastic elastomers, thermoplastic rubber (TPR), silicone rubber. The flexible protrusion may have flexibility to compress when the other protrusion is pressed against the flexible protrusion, and decompress when the other protrusion is moved away. The flexible protrusion allows the cover unit 404 to move from the position as shown in FIG. 4(b) to the closing or fully-closed position.

In an example implementation, the first protrusion 416 is flexible, and the second protrusion 418 is non-flexible. The non-flexible protrusion may be made of a hard polymer material, a metal, a ceramic, or a composite material. The hard polymer material may, for example, include a thermosetting polymer, such as epoxy. In another example implementation, the first protrusion 416 is non-flexible, and the second protrusion 418 is flexible. In another example implementation, both the first protrusion 416 and the second protrusion 418 are flexible.

In an example implementation, the device 400 may include a closure unit between the cover unit 404 and the base unit 402. The closure unit is to move the cover unit 404 from the position at which the cover unit 404 subtends or forms the predefined angle θ° with the base unit 402 to the closing position. During the movement of the cover unit 404 to the closing position, the hinge shaft 408 is to rotate to press the first protrusion 416 against the second protrusion 418. At the closing position of the cover unit 404, the protrusion that is flexible may be compressed.

In an example implementation, the closure unit may be a magnet-based closure unit. As shown in FIGS. 4(a) and 4(b), each of the base unit 402 and the cover unit 404 includes a magnet 426-1, 426-2. It may be noted that the magnets 426-1 and 426-2 are of opposite magnetic polarities. The magnets 426-1 and 426-2 may have magnetic strength such that the magnetic force between the magnets 426-1 and 426-2 can move the cover unit 404 from the position at which the cover unit 404 is at the predefined angle θ° from the base unit to the closing position. Such a movement of the cover unit 404 compresses the protrusion that is flexible.

In another example implementation, the device 400 may include a mechanical latch. The cover unit 404 may be manually pushed down from the position of the cover unit as shown in FIG. 4(b). The mechanical latch may lock the cover unit 404 at the closing position.

It may be noted that the examples of the present subject matter described herein mention rotation control units to be disposed in a base unit of a device. However, in an example implementation, the rotation control unit may be disposed in a cover unit of a device to control a rotation of a hinge shaft of a hinge connector that couples the cover unit with a base unit of the device.

Although examples for the present disclosure have been described in language specific to structural features, it is to be understood that the appended claims are not limited to the specific features described herein. Rather, the specific features are disclosed and explained as examples of the present disclosure.

We claim:

1. A base unit for a device, comprising:
   a hinge connector comprising:
     a hinge shaft including a first protrusion on a surface of the hinge shaft; and
     a hinge bracket coupled to the hinge shaft, the hinge bracket being couplable to a cover unit of the device to pivot the cover unit about the base unit; and
   a rotation control unit coupled to the hinge shaft, wherein the rotation control unit comprises a plurality of rollers and a traction belt having an interior surface that is movable over the plurality of rollers and an exterior surface opposite the interior surface that includes a second protrusion, the rotation control unit to:
     control a rotation of the hinge shaft by having the traction belt in contact with the hinge shaft; and
     stop a free-rotation of the hinge shaft in one direction, at a predefined angle between the hinge bracket and the base unit by having the second protrusion on the exterior surface of the hinge belt contact the first protrusion on the surface of the hinge shaft.

2. The base unit as claimed in claim 1, wherein the predefined angle is in a range of 3° to 15°.

3. The base unit as claimed in claim 1, wherein at least one of the first protrusion and the second protrusion is flexible.

4. A device comprising:
   a base unit;
   a cover unit coupled to the base unit by a hinge connector, the hinge connector including a hinge shaft including a first projection on a surface of the hinge shaft; and
   a rotation control unit coupled to the hinge shaft, wherein the rotation control unit comprises a plurality of rollers and a traction belt having an interior surface that is movable over the plurality of rollers and an exterior surface opposite the interior surface that includes a second protrusion, the rotation control unit to:
     control a rotation of the hinge shaft by having the traction belt in contact with the hinge shaft; and
     stop a free-rotation of the hinge shaft at a predefined angle between the cover unit and the base unit during movement of the cover unit towards a closing position with respect to the base unit by having the second protrusion on the exterior surface of the hinge belt contact the first protrusion on the surface of the hinge shaft.

5. The device as claimed in claim 4, wherein at least one of the first protrusion and the second protrusion is flexible.

6. The device as claimed in claim 5, further comprising a closure unit between the cover unit and the base unit, the closure unit is to move the cover unit to the closing position, wherein during movement of the cover unit to the closing position, the hinge shaft is to rotate to press the first protrusion against the second protrusion.

7. The device as claimed in claim 4, wherein the predefined angle is in a range of 3° to 15°.

8. A device comprising:
   a base unit;
   a cover unit coupled to the base unit by a hinge connector, the hinge connector including a hinge shaft having a first protrusion on a surface thereof; and
   a rotation control unit disposed in the base unit, the rotation control unit comprising a plurality of rollers and a traction belt including an interior surface that is movable over the plurality of rollers and an exterior surface located opposite the interior surface and that is to engage with the hinge shaft to control a rotation of the hinge shaft, the traction belt comprising a second protrusion on the exterior surface thereof, wherein, when the cover unit is at a predefined angle with respect to the base unit during movement of the cover unit towards a closing position, the first protrusion is to contact the second protrusion to stop a free-rotation of the hinge shaft.

9. The device as claimed in claim 8, wherein at least one of the first protrusion and the second protrusion is flexible.

10. The device as claimed in claim 9, further comprising a closure unit between the cover unit and the base unit, the closure unit is to move the cover unit to the closing position, wherein during movement of the cover unit to the closing position, the hinge shaft is to rotate to press the first protrusion against the second protrusion.

11. The device as claimed in claim 8, wherein the predefined angle is in a range of 3° to 15°.

12. The device as claimed in claim 6, wherein the closure unit is a magnet-based closure unit.

13. The device as claimed in claim 12, wherein the base unit includes a magnet, and the cover unit includes a magnet.

14. The device as claimed in claim 13, wherein the magnet in the base unit and the magnet in the cover unit are opposite polarities.

15. The base unit as claimed in claim 1, wherein the rotation control unit is further to permit free rotation of the hinge shaft when not at the predefined angle between the hinge bracket and the base unit.

* * * * *